US007860788B2

(12) United States Patent
Rieger et al.

(10) Patent No.: US 7,860,788 B2
(45) Date of Patent: *Dec. 28, 2010

(54) SYSTEM AND METHOD FOR EVALUATING REAL ESTATE TRANSACTIONS

(75) Inventors: Robert Rieger, Trumbull, CT (US); Thomas Tyson Lowery, Stanford, CT (US); Catherine M. Dunn, New York, NY (US)

(73) Assignee: General Electric Capital Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/283,958

(22) Filed: Sep. 17, 2008

(65) Prior Publication Data

US 2009/0024454 A1    Jan. 22, 2009

Related U.S. Application Data

(63) Continuation of application No. 10/074,299, filed on Feb. 12, 2002, now Pat. No. 7,440,921.

(51) Int. Cl.
*G06Q 40/00* (2006.01)
(52) U.S. Cl. .................... 705/38; 705/35; 705/36 R
(58) Field of Classification Search .............. 705/35, 705/36 R, 38
See application file for complete search history.

(56) References Cited

U.S. PATENT DOCUMENTS

| 5,361,201 | A | * | 11/1994 | Jost et al. ................. 705/35 |
| 5,414,621 | A |   | 5/1995  | Hough |
| 5,680,305 | A |   | 10/1997 | Apgar, IV |
| 5,699,527 | A |   | 12/1997 | Davidson |
| 5,754,850 | A |   | 5/1998  | Janssen |
| 5,802,501 | A | * | 9/1998  | Graff ..................... 705/36 R |
| 5,857,174 | A | * | 1/1999  | Dugan ..................... 705/1.1 |
| 5,940,812 | A | * | 8/1999  | Tengel et al. .............. 705/38 |
| 5,966,700 | A | * | 10/1999 | Gould et al. .............. 705/38 |
| 5,995,947 | A | * | 11/1999 | Fraser et al. .............. 705/38 |
| 6,023,687 | A |   | 2/2000  | Weatherly et al. |
| 6,049,784 | A |   | 4/2000  | Weatherly et al. |
| 6,067,533 | A | * | 5/2000  | McCauley et al. .......... 705/38 |
| 6,115,694 | A |   | 9/2000  | Cheetham et al. |

(Continued)

OTHER PUBLICATIONS

Winker, Kevin: "Technology for Risk-based Pricing and Management", Mortgage Banking; p. 75, Mar. 1999.

(Continued)

*Primary Examiner*—Jagdish N Patel
*Assistant Examiner*—Kenneth Bartley
(74) *Attorney, Agent, or Firm*—King & Spalding LLP

(57) ABSTRACT

Evaluating a real estate transaction based on preliminary data about the transaction. An evaluation system employs a transaction evaluator software module that can receive input about a customer and a type of financial product. The transaction evaluator software module also has access to a variety of data sources defining parameters for the investing institution. When the transaction evaluator receives input for a customer, it retrieves the relevant parameters for investing and performs a series of calculations to determine the likelihood that the customer's transaction will be approved. The results of the calculations can be displayed to the user in a graphical format for a range of transaction values. The graphical presentation of the calculations assists the user in determining whether to proceed with the transaction.

16 Claims, 16 Drawing Sheets

U.S. PATENT DOCUMENTS

| | | | |
|---|---|---|---|
| 6,233,566 B1* | 5/2001 | Levine et al. | 705/36 R |
| 6,321,202 B1 | 11/2001 | Raveis, Jr. | |
| 6,684,189 B1* | 1/2004 | Ryan et al. | 705/4 |
| 6,785,661 B1 | 8/2004 | Mandler et al. | |
| 6,871,140 B1* | 3/2005 | Florance et al. | 701/207 |
| 6,904,412 B1 | 6/2005 | Broadbent et al. | |
| 6,985,886 B1* | 1/2006 | Broadbent et al. | 705/38 |
| 6,988,082 B1* | 1/2006 | Williams et al. | 705/36 T |
| 7,162,445 B2* | 1/2007 | Johnson et al. | 705/35 |
| 7,225,153 B2* | 5/2007 | Lange | 705/37 |
| 7,315,841 B1* | 1/2008 | McDonald et al. | 705/38 |
| 7,353,198 B2* | 4/2008 | Rios et al. | 705/36 R |
| 7,386,504 B2* | 6/2008 | McDonald et al. | 705/38 |
| 7,392,210 B1* | 6/2008 | MacKay et al. | 705/35 |
| 7,415,471 B1* | 8/2008 | Coleman | 1/1 |
| 7,499,882 B2* | 3/2009 | Cole | 705/37 |
| 7,555,459 B2* | 6/2009 | Dhar et al. | 705/38 |
| 7,765,151 B1* | 7/2010 | Williams et al. | 705/38 |
| 2001/0034695 A1* | 10/2001 | Wilkinson | 705/37 |
| 2001/0039506 A1 | 11/2001 | Robbins | |
| 2001/0039525 A1 | 11/2001 | Messmer et al. | |
| 2001/0047326 A1* | 11/2001 | Broadbent et al. | 705/38 |
| 2002/0004737 A1 | 1/2002 | McVeigh | |
| 2002/0046144 A1* | 4/2002 | Graff | 705/36 |
| 2002/0052814 A1 | 5/2002 | Ketterer | |
| 2002/0059137 A1 | 5/2002 | Freeman et al. | |
| 2002/0099650 A1* | 7/2002 | Cole | 705/38 |
| 2002/0152155 A1 | 10/2002 | Greenwood et al. | |
| 2003/0028478 A1* | 2/2003 | Kinney et al. | 705/38 |
| 2003/0126052 A1* | 7/2003 | Rademaekers et al. | 705/35 |
| 2003/0139990 A1* | 7/2003 | Greco | 705/35 |
| 2003/0144945 A1* | 7/2003 | Opsahl-Ong et al. | |
| 2003/0144949 A1* | 7/2003 | Blanch | 705/38 |
| 2003/0229582 A1* | 12/2003 | Sherman et al. | 705/38 |
| 2004/0019558 A1* | 1/2004 | McDonald et al. | 705/38 |
| 2004/0143450 A1 | 7/2004 | Vidali | |
| 2004/0267651 A1* | 12/2004 | Jenson et al. | 705/36 |
| 2005/0091305 A1 | 4/2005 | Lange et al. | |
| 2006/0161482 A1 | 7/2006 | Jacobson et al. | |
| 2008/0103963 A1 | 5/2008 | Mahoney et al. | |

OTHER PUBLICATIONS

Hanrahan, Michael J.: "Future lies in Investment Analysis, Property Management Programs", National Real Estate Investor v 35 nl pp: 69-79, Jan. 1993.

* cited by examiner

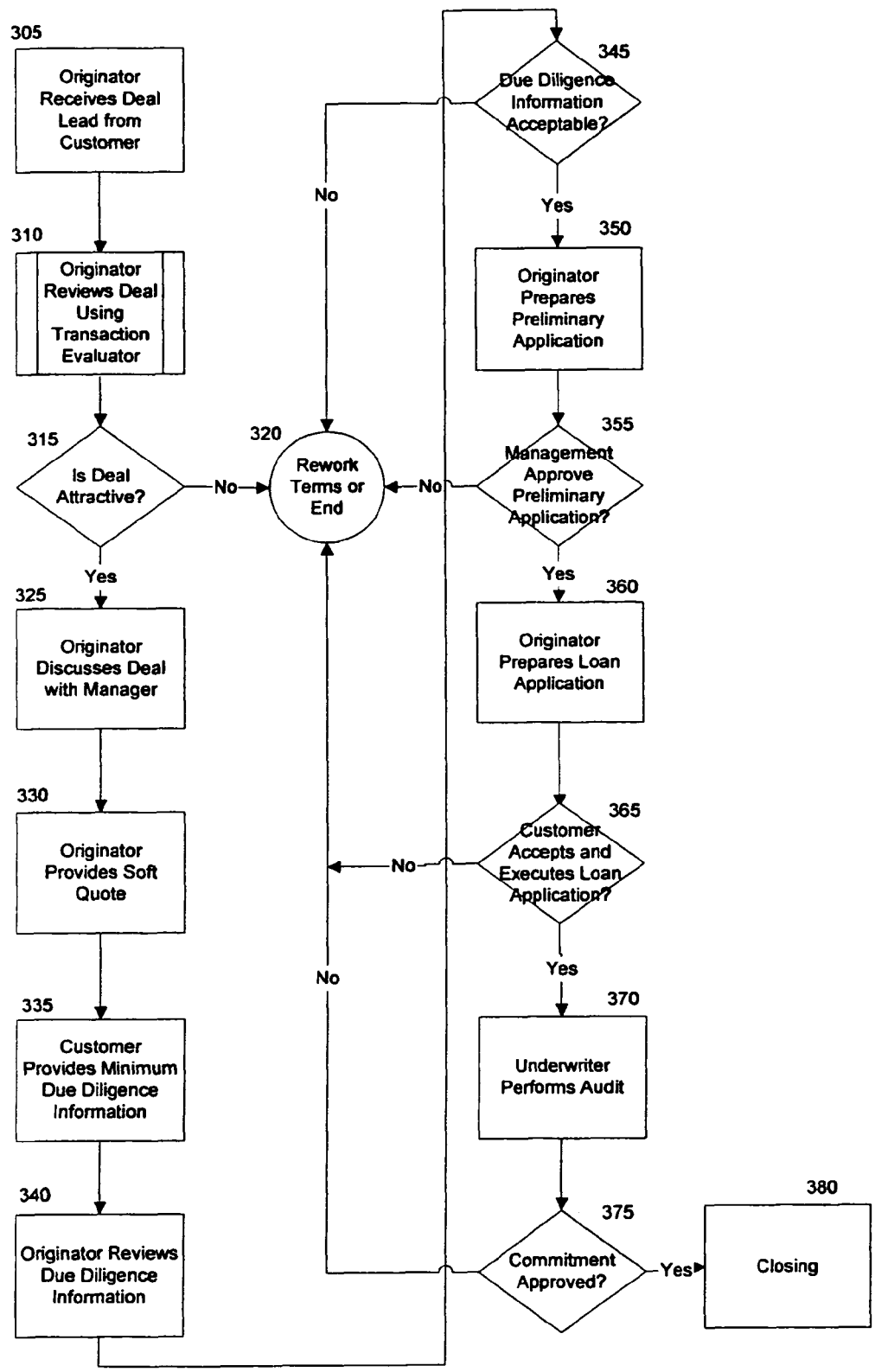
FIG. 3 — Overview Of Real Estate Transaction

Transaction Evaluation Process
(cont.)

Calculating Loan Size Array

Calculate Minimum Price Curves

Calculate Maximum Price Curves

| Collateral Type (Pull Down Menu) | Collateral Type (for market hurdle) |
|---|---|
| Office - CBD (Class A) | Office |
| Office - CBD (Class B) | Office |
| Office - Suburban (Class A) | Office |
| Office - Suburban (Class B) | Office |
| Multifamily - Class A | Multifamily |
| Multifamilty - Class B | Multifamily |
| 4/5 Star Mobile Home | Multifamily |
| 3 Star Mobile Home | Multifamily |
| Grocery/ Drug Store | Retail |
| Community Center | Retail |
| Power Center | Retail |
| Regional Mall | Retail |
| Industrial - Class A | Industrial |
| Industrial - Class B | Industrial |
| Self-Storage | Industrial |

FIG. 11A

| Product Type | Product Type (for market hurdle) |
|---|---|
| On-book Debt, S/T, fixed rate | Debt, S/T |
| On-book Debt, S/T, floating rate | Debt, S/T |
| On-book Debt, L/T, fixed rate | Debt, L/T |
| On-book Debt, L/T, floating rate | Debt, L/T |
| CMBS (fixed rate) | Debt, L/T |
| CMBS (floating rate) | Debt, L/T |
| Equity, S/T | Equity, S/T |
| Equity, L/T | Equity, L/T |

○ ○ ○     Print   PDF   Export   Help

Probability

Details

Parameters     [ Denver Office CMBS version 1 ]

WELCOME
Sample User
10/2/07 11:31 AM
Log Out

Digital Deal Screen
Deal Details

Functions

Statistics
Home

☑ Denver

Deal Detail #

| Field | Value |
|---|---|
| Amortization | 30 year amortization |
| Term | 10 years |
| Deal Purpose | Purcase, > 20% equity |
| Escrows | Tax and insurance escrows |
| Replacement Rsvs | $0.20 per SF or more |
| Defeasance/YM | Yard maintenance |
| Lockbox | Lockbox |
| Interest Only | No interest-only period |

Asset Specific

| Field | Value |
|---|---|
| Property Class | A |
| Tenant Profile | Multiple Tenants |
| Location | MSA population: > 250,000 |
| Lease Provision | >50% of leases expire in any 3-year period |
| Parking | Suburb - on-site (3.5 per 1000 SF) |

Details

| Field | Value | Field | Value |
|---|---|---|---|
| Loan Size | $10,000,000 | Spread (bps over index) | 250 |
| NOI after Replacement Reserves | $1,700,000 | CF before Debt Service | $1,500,000 |
| Cap Rate | 9.5% | | |

Resources

° GE Intranet
° Digital Cockpit
° Score
° Market @ a Glance
° GECapital
  RealEstate.com
° PPR
° On-book Debt
  Pricing Matrix
° CMBS Pricing
  Matrix
° Strike Zone
  Information
° GE Hurdle data
° Valuation
  Assumption
  Guidelines

| Deal Purpose | Price Impact | Proceed Impact | Deal Impact |
|---|---|---|---|
| Purchase, <5% equity | 10 | 0% | 0 |
| Purchase, 5-9.9% equity | 0 | 0% | 0 |
| Purchase, 10-20% equity | 0 | 0% | 0 |
| Purchase, >20% equity | -10 | 0% | 0 |
| Refinance, 0-5% equity | 10 | 0% | 0 |
| Refinance, 5-10% equity | 0 | 0% | 0 |
| Refinance, 10-20% equity | 0 | 0% | 0 |
| Refinance, >20% equity | -10 | 0% | 0 |
| Cash out | 20 | 0% | 0 |
| Deserved cash out (no penalty) | 0 | 0% | 0 |

FIG. 13

SYSTEM AND METHOD FOR EVALUATING REAL ESTATE TRANSACTIONS

RELATED APPLICATIONS

This application is a continuation of and claims priority to U.S. patent application Ser. No. 10/074,299, filed Feb. 12, 2002 now U.S. Pat. No. 7,440,921, and entitled "System and Method for Evaluating Real Estate Transactions." The content of this prior application is hereby fully incorporated herein by reference.

TECHNICAL FIELD

The present invention is generally directed to evaluating real estate transactions. More specifically, the present invention provides a system and software module that support analysis of the risks and costs involved in a real estate transaction to provide an indicator of whether a lender will approve the transaction.

BACKGROUND OF THE INVENTION

One segment of the economy that financial institutions invest money in is real estate. The financial institutions that invest in real estate include banks, savings and loan associations, pension funds, insurance companies, mortgage banking companies, credit unions, real estate investment trusts (REITs), and state agencies. The financing may be done on a debt basis, where the investor receives a mortgage, or an equity basis, where the investor receives an equity stake in the investment. A variation on debt financing of real estate is purchasing mortgage-backed securities. The purchase of mortgage-backed securities is a type of loan participation where the investor buys an undivided interest in an aggregate of mortgage loans.

An investment transaction in the real estate market generally goes through a cycle of several steps beginning with the initial inquiry and ending with the closing of the deal if it is approved. Typically, the inquiry step begins with an employee of the investor called an originator. The originator receives inquiries from customers or looks for transactions in which the investor can place money. The originator will often spend a significant amount of time collecting information about an investment opportunity to determine whether it is a desirable investment for her employer. The originator's work can include collecting due diligence information from the customer about the customer's business and the property that will secure the investment. The originator will often discuss the potential transaction with a risk manager to receive an initial opinion on whether the transaction will likely be approved. If the initial indications are favorable, the originator typically prepares a preliminary application for review by management. Management's review of a preliminary application generally involves several steps of review by various risk managers that can take two to three weeks. In situations where the preliminary application is not approved, the originator often works with the customer to modify the terms of the transaction to make them more acceptable.

Once the preliminary application is approved, the originator works with the customer to prepare a detailed loan application describing the transaction for review by management. Upon receipt of a detailed loan application, the underwriter for the transaction conducts an audit of the customer and the deal. Before a transaction closes, it typically goes through several stages of review by management personnel within the investing institution. Management personnel review transaction packages to determine whether they are within risk and pricing parameters established by the investor. The risk and pricing parameters generally fluctuate and can involve complex analysis of many factors. If the transaction satisfactorily meets the risk and pricing parameters, management approves the transaction for closing.

Currently, there are certain tools available that assist loan originators and managers in reviewing loan applications. The conventional software tools available typically comprise a static spreadsheet that examines a particular factor for a single financial product. There are also a variety of checklists and guidelines that consider different factors that can affect the financial product. However, there is no comprehensive tool that simply and quickly evaluates a variety of factors for different types of real estate investments to determine whether it is a favorable transaction.

There are several limitations with the current system of processing real estate investment packages. First, the time spent from the initial inquiry to the preliminary approval is too long. Customers often have to wait more than a month after making an inquiry on a transaction to learn whether they have received preliminary approval. Second, the review process can appear to be subjective and arbitrary to the customer. For example, the investor may alter the terms of the transaction or reject the transaction all together during the several stages of review that the application undergoes. Finally, the employees of the investor can waste a significant amount of time on deals that are unlikely to be approved. Both the originator and the management reviewing the transaction can spend considerable time preparing an application and reviewing it before it is determined that the transaction is unlikely to be approved.

In view of the foregoing, there is a need for a system and method that can efficiently evaluate real estate transactions to determine the probability of them ultimately being approved. Specifically, a need exists to make a rapid determination, based on preliminary information from the customer, as to the probability of the transaction being approved. Making this determination provides the customer with an early indicator as to the likely success of the transaction. A further need exists to combine the various data sources used to evaluate a transaction into a single, user-friendly package. A simplified evaluation tool also helps the originator and reviewer avoid wasting significant time on transactions that are unlikely to be approved. Moreover, making the investor's employees more efficient reduces the investor's costs and increases the speed with which transaction packages can be processed.

SUMMARY OF THE INVENTION

The present invention is generally directed to a software module operating in a distributed computing environment that supports the evaluation of real estate investment transactions. The present invention improves upon existing methods of processing such transactions by determining a probability of success based on preliminary information defining the transaction. The preliminary information can comprise the type and amount of the investment, a description of the collateral, and identification of the geographic market. Using this information and predetermined parameters selected by the investor, the software module can calculate a probability for approval of the transaction. Enabling an evaluation of the transaction at an early stage of the process allows for more efficient use of resources for the investor and the customer.

In one aspect, the invention provides a method for providing a preliminary evaluation of the probability of a real estate transaction being approved by an evaluating party, such as an investor in connection with transaction financing. The invention comprises an evaluator software module operating in a distributed computing environment that can receive identifying information describing a real estate transaction from a data source, such as an originator. The identifying information can include the type of financial product the customer is interested in to finance the transaction, the type of collateral the customer is providing, and the market where the collateral is located. The evaluator software module can make an initial determination of whether the transaction is favorable based on the identifying information. The initial determination can be made by comparing the identifying information to pre-selected parameters typically chosen by the investor. Assuming that the identifying information is acceptable, the evaluator software module can receive product specific information from a data source, such as the originator. Product specific information can comprise the loan size, the customer's net operating income, the cost of the loan, the term of the loan, additional information about the value of the collateral, and other risk factors for the transaction. The evaluator software module uses this information to calculate the probability of approval over a range of loan values. A decision-maker, typically the investor, can decide which factors affect the probability of approving the transaction. The probability calculation can then be used by the originator or investor to decide whether to pursue the transaction.

In another aspect, the invention comprises a method for using an evaluator software module to determine whether to proceed with a real estate transaction. The method comprises inputting identifying information about a transaction into an evaluator software module and comparing the identifying information to pre-selected parameters. The identifying information can include the financial product, the collateral type, and the market. If the identifying information is within the pre-selected parameters, the user, typically an originator, receives a favorable determination from the evaluator software module and can proceed with inputting product specific information. The product specific information can include the term, size, and cost of the loan, details about the value of the collateral, and other risk factors. The evaluator software module calculates the probability for approval of the transaction from the product specific information over a range of loan values. The user can receive the probability determination from the evaluator software module and decide whether to proceed with the transaction.

In yet another aspect, the invention comprises a computer-implemented system to support the evaluation of a real estate transaction. The system comprises an evaluator software module capable of receiving information about a transaction. The evaluator software module typically resides on a server and is accessible by users, such as originators, operating client computers coupled to the server over a network. The network may be a local area network, such as a company intranet, or may employ a wide area network, such as the Internet. The evaluator software module can also be coupled to a variety of data sources containing pricing data and preferences for the types of preferred transactions. The evaluator software module can receive identifying information to make an initial determination as to whether the product type, market, and collateral are desirable. If the identifying information is satisfactory, the evaluator software module can receive more specific product information about the transaction. Product information can include the loan size, term, and cost, details about the customer's income and collateral, and other risk factors. The evaluator software module uses the product information and the preferences and pricing data to determine the probability of approval over a range of loan amounts.

These and other aspects of the invention will be described below in connection with the drawing set, the specification and claim set.

BRIEF DESCRIPTION OF THE DRAWINGS

FIG. 3 is a logic flow diagram illustrating an exemplary process for preparing and reviewing a real estate transaction using a transaction evaluator.

FIGS. 11A and 11B illustrate exemplary tables used to organize identifying information to determine whether a proposed transaction has acceptable market hurdles in accordance with an exemplary embodiment of the present invention.

FIG. 12 is a display screen for entering product specific information for a transaction in accordance with an exemplary embodiment of the present invention.

FIG. 13 illustrates an exemplary table associating predetermined impact factors with various types of transactions in accordance with an exemplary embodiment of the present invention.

DETAILED DESCRIPTION OF THE EXEMPLARY EMBODIMENTS

Figure 1:
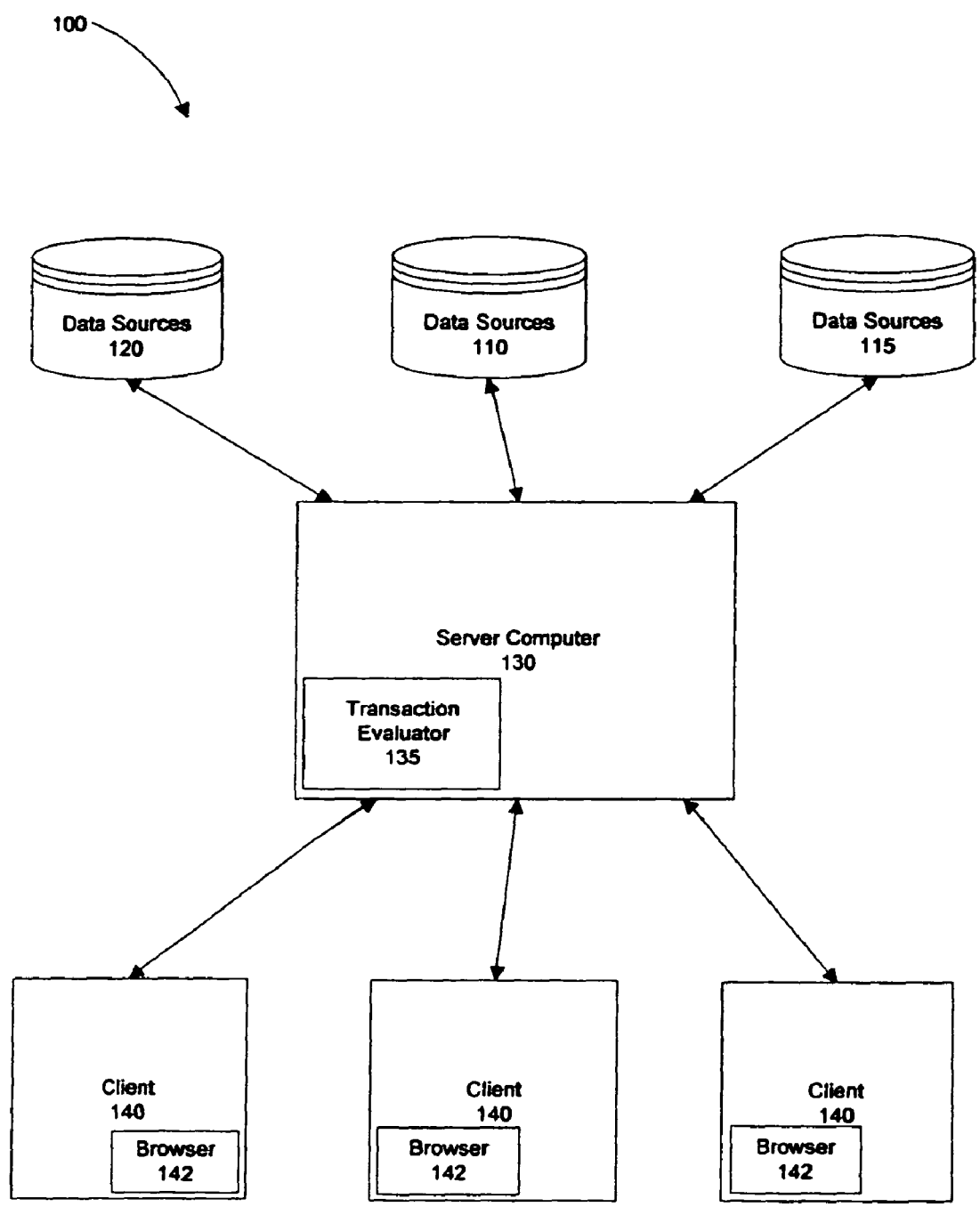
FIG. 1 is a functional block diagram illustrating the architecture of a distributed computing network in accordance with an exemplary embodiment of the present invention.

The present invention supports the evaluation of a proposed real estate transaction. Specifically, the present invention provides a preliminary analysis and determination of the probability that a transaction will ultimately be approved by a reviewing party, such as an investor. Applying for and closing a commercial real estate transaction is a complex process involving several steps of review. For the customer of an investing institution, the time period from application to preliminary approval can take several weeks. Furthermore, the factors involved in the review and approval of a transaction are often unknown and can create a great deal of uncertainty.

The present invention allows for screening of proposed real estate transactions based on preliminary information. For example, the invention can use information supplied by the customer and predetermined guidelines set by the investor to calculate the probability that the transaction will be approved. The probability calculation can be done over a range of cost and proceed values for the transaction. Evaluating the proposed transaction at an early stage helps the customer decide whether to go forward with the transaction and provides uniformity to the evaluation process. Screening deals at an early stage also allows the investor's employees to work more efficiently and to devote their time to transactions that are likely to be approved. Throughout this specification the terms "deal" and "transaction" will be used interchangeably to refer to a variety of financial investments where real estate is the underlying collateral.

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations in a distributed computing environment by conventional computer components, including remote file servers, remote computer servers, processing units, local computer systems, local or remote memory storage devices, display devices and input devices. Each of these conventional distributed computing components is accessible by the processing unit via a communications network.

The processes and operations performed by the distributed computing environment include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention also includes a computer program which embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

Referring now to the drawings, in which like numerals represent like elements throughout the several figures, aspects of the present invention and an exemplary operating environment will be described.

FIG. 1 illustrates various aspects of an exemplary computing environment in which the present invention is designed to operate. Those skilled in the art will appreciate that FIG. 1 and the associated discussion are intended to provide a general description of representative computer devices and program modules.

FIG. 1 illustrates the architecture 100 for supporting the operation of an exemplary embodiment of the present invention. As shown in FIG. 1, a transaction evaluator software module 135 operates on a server computer 130. The server computer 130 is coupled to a variety of data sources 110, 115, and 120. Also, coupled to the server computer are one or more clients 140. A client can interact with the transaction evaluator software module 135 using a browser 142. Typically, an originator, working for the investing institution, analyzes a potential transaction by pointing the browser 142 to the transaction evaluator software module 135. The originator can input information about the customer and the transaction and this data is received by the transaction evaluator software module 135. The data sources 110, 115, and 120 can contain pricing information and other investing guidelines selected by the investor. The transaction evaluator software module 135 retrieves pricing data and investing guidelines from the data sources and can perform calculations to determine the likelihood that the transaction will be approved based on the information supplied by the customer. The various elements shown in FIG. 1 can be connected by a local area network, such as a company-wide intranet, or a wide area network such as the Internet.

Figure 2:
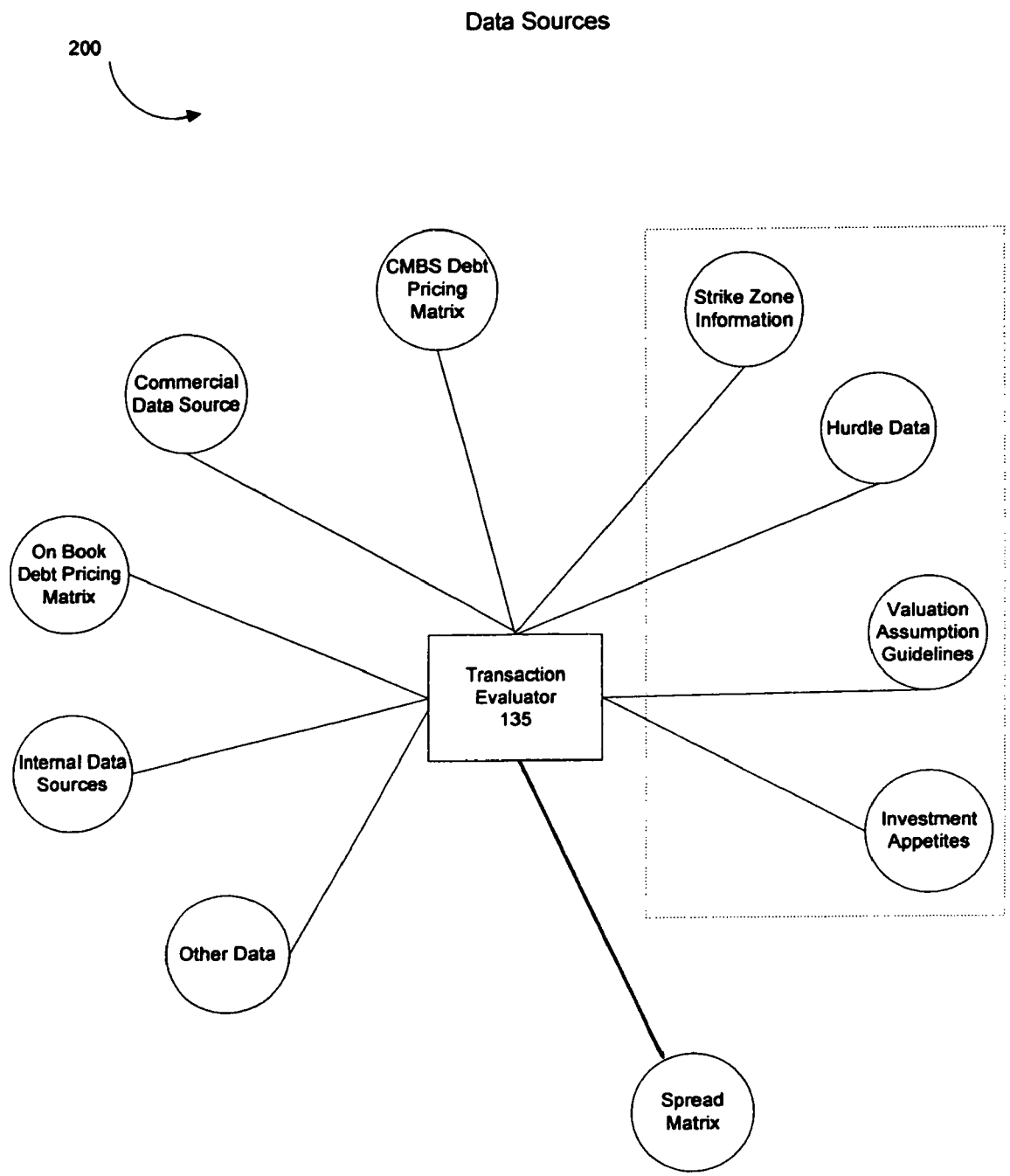
FIG. 2 is a functional block diagram illustrating exemplary types of data sources coupled to a transaction evaluator.

FIG. 2 illustrates in greater detail the various information stored in the data sources 110, 115, and 120. The market hurdle data, valuation assumption guidelines, and investment appetites are criteria used by the investor to distinguish between attractive and undesireable investment opportunities. The market hurdle data, valuation assumptions, and investment appetites can be compared against identifying information such as product type, market, and collateral type. Another source of data the transaction evaluator 135 can use is a pricing matrix. Pricing matrices are specific to the type of product the customer is interested in pursuing such as on-book debt or commercial mortgage-backed securities. The transaction evaluator 135 can also receive data from commercial data sources that evaluate the real estate market and from internal sources indicating management preferences. The actual data contained in the data sources can be modified by the investor to change investing strategy. Furthermore, the transaction evaluator 135 may utilize only some, or all, of the data sources shown in FIG. 2.

FIG. 3 presents an overview of an exemplary real estate transaction utilizing the transaction evaluator software module 135. In alternative embodiments of the present invention certain of the steps shown in FIG. 3 may be performed in a different order or not performed at all. In step 305, an originator receives a deal lead from a customer. The deal lead may have resulted from inquiries by the originator or from a request by a customer. In step 310, the originator reviews the deal using the transaction evaluator software module 135. The review performed in step 310 is based merely on preliminary information, which can be supplied by the customer or estimated by the originator. The steps involved in using the transaction evaluator 135 are discussed in greater detail in connection with FIGS. 4A and 4B. If the originator receives a favorable response from the transaction evaluator 135 in step 315, the originator will discuss the proposed deal with a manager in the investing company. If the deal is not attractive in step 315, the originator may attempt to re-work the terms with the customer or may abandon the deal.

After discussing the deal with a risk manager in step 325, the originator will provide a soft quote for the deal to the customer in step 330. The customer then provides minimum due diligence information to the originator in step 335 so that the transaction can go forward. In step 340, the originator reviews the due diligence information and if it is acceptable in step 345, the originator prepares a preliminary application in step 350. If the preliminary application is approved in step 355, the originator will go forward with preparing a complete loan application in step 360. If the preliminary application is not approved, the originator can attempt to re-work the terms of the deal or abandon it. If the customer accepts the loan application prepared by the originator in step 365, the underwriter for the transaction will perform an audit in step 370. If the application is approved in step 375, the transaction will go to closing in step 380. Although certain investors may not perform all of the aforementioned review steps, utilizing the transaction evaluator 135 at the beginning of the process provides for a more uniform and efficient application process.

Figure 4A:
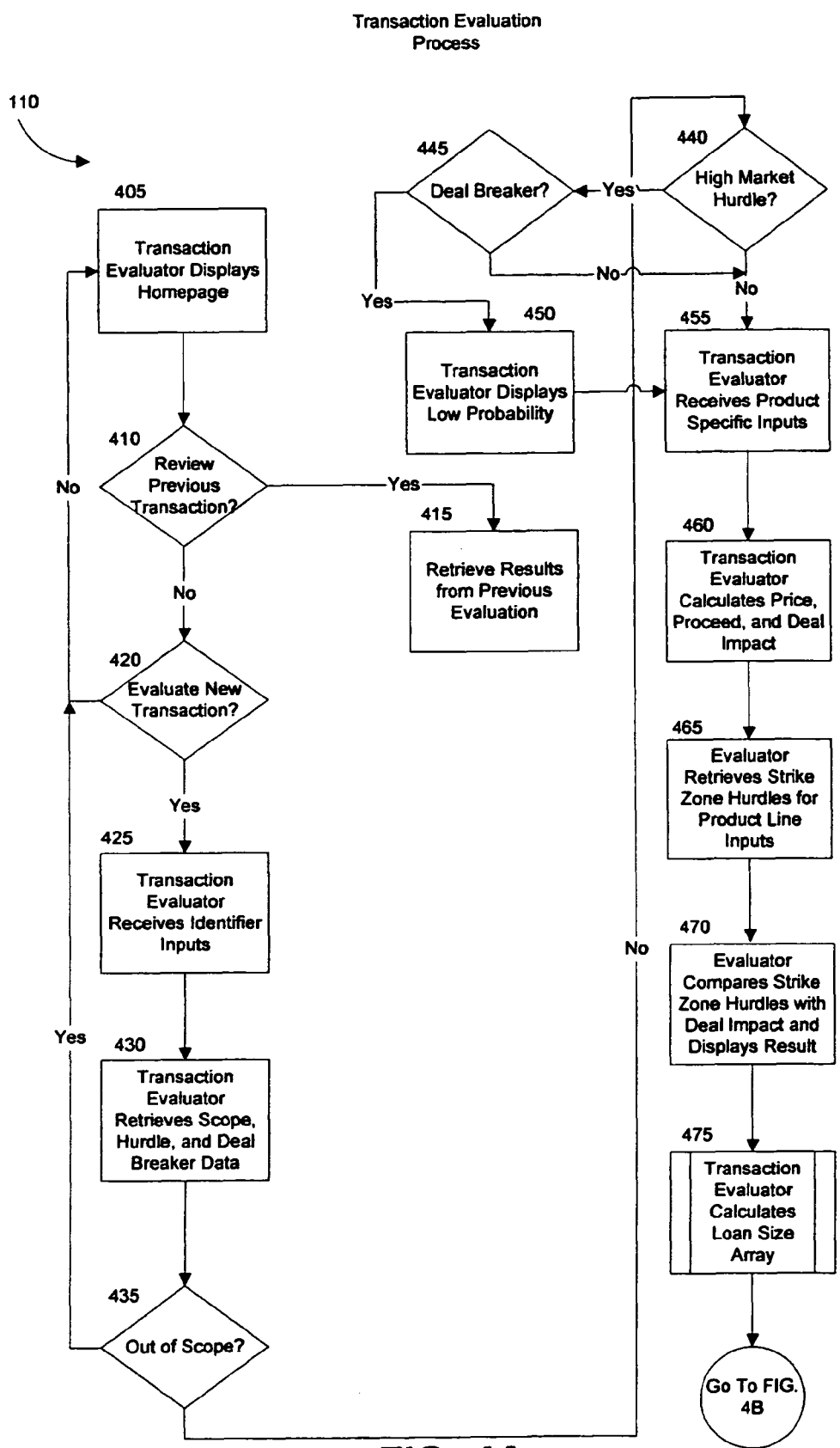
FIGS. 4A and 4B are logic flow diagrams illustrating the steps performed by a transaction evaluator in accordance with an exemplary embodiment of the present invention.
Figure 4B:
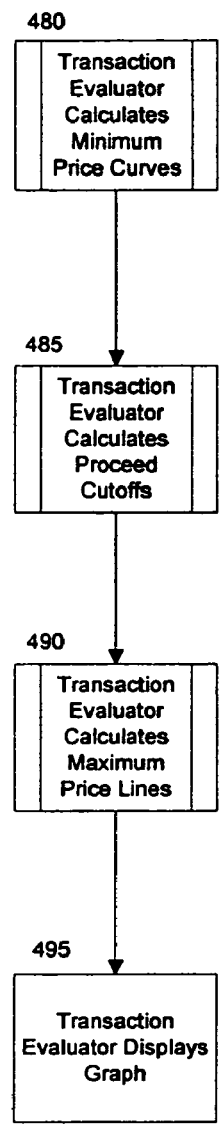
Figure 10:
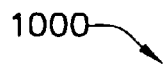
FIG. 10 is a display screen for entering identifying information for a transaction in accordance with an exemplary embodiment of the present invention.

FIGS. 4A and 4B illustrate in greater detail an exemplary transaction evaluation process 310. The exemplary embodiment described herein produces a graph with a range of prices and proceed values. Alternative embodiments of the present invention may analyze the transaction information differently or present an evaluation in other forms such as a percentage or a rating of the deal. In step 405, the transaction evaluator displays a home page with various options represented graphically to the originator. In step 410, the originator can choose to either input a new transaction or to review a previously entered transaction. If the originator chooses to review a previous transaction, the transaction evaluator software module 135 retrieves the results from the previous evaluation from a storage device in step 415. If the originator chooses to enter a new transaction in step 420, the "Yes" branch is followed to step 425, where the originator begins by inputting identifying information for the transaction. An exemplary screen display for inputting identifying information for the transaction is illustrated in FIG. 10. As FIG. 10 shows, typical identifying information comprises a market, a financial product type, and a type of collateral to secure the transaction. In the exemplary embodiment described herein, the identifying information is grouped into general categories of collateral type and product type. Exemplary tables illustrating the grouping of collateral type and product type are illustrated in FIGS. 11A and 11B.

In step 430, the transaction evaluator 135 retrieves the relevant scope data, market hurdle data, and deal-breaker data from a data source 110. The scope data, market hurdle data, and deal-breaker data are parameters selected by the investing institution that define the type of investments that are desirable. In step 435, the transaction evaluator first looks to determine whether the collateral type and product type are beyond the scope of potential deals considered by the investor. If so, the originator is returned to the home page and the deal will not be further evaluated. In steps 440 and 445, the transaction evaluator 135 examines the identifying data to determine whether there is a high market hurdle or deal breaker factor. If the answer to these two queries is affirmative, the transaction evaluator 135 displays a low probability of the deal being approved to the originator in step 450. For example, market conditions might cause on-book debt in high market hurdle areas to be completely unwanted and would trigger the dealbreaker factor. If the two queries in steps 440 and 445 are not both answered affirmatively, the transaction evaluator 135 proceeds to the next step of the analysis.

In step 455, the transaction evaluator receives product specific input from the originator. An exemplary screen display for receiving product specific input is illustrated in FIG. 12. The inputs illustrated in FIG. 12 are specific to a commercial mortgage backed security product. The data input for other types of financial instruments such as conventional debt or equity, may vary from the entries illustrated in FIG. 12. As the data illustrated in FIG. 12 shows, the product specific data contains additional information describing the type of loan, the assets securing the loan, risk factors, and information about the customer. For each piece of data entered in FIG. 12, the investor can set parameters used to assess the input. For example, FIG. 13 illustrates an exemplary table containing parameters for the various types of deal purposes that the customer may have. In the exemplary illustration shown in FIG. 13, three characterizations, price impact, proceed impact and deal impact are used to describe the data input for the customer. In this example, the purchase of a small amount of equity is considered an undesirable transaction and is given a high price impact of 10. In contrast, transactions involving the purchase or refinance of a large equity stake are given a negative (low) price impact. In the exemplary scheme shown herein, the larger the price impact the lower the probability of the deal being approved. Similar impact tables exist for each of the potential data elements shown in FIG. 12.

In step 460, the transaction evaluator 135 sums the total price impact, proceed impact and deal impact from each entry for this potential transaction. In step 465, the transaction evaluator 135 retrieves the strike zone data from the data source 110 that corresponds with the identifying information entered in step 425. The strike zone hurdles are criteria preselected by the investor. In step 470, the transaction evaluator 135 will compare the criteria of the strike zone hurdles with the total deal impact number and displays this result.

The result from the strike zone hurdle is one of two indicators that the originator can use to decide whether to pursue a deal. The other indicator that the transaction evaluator 135 provides is a price/proceeds probability graph for a range of loan values. Price and proceed curves are plotted on the probability graph to define areas of high or low probability that the transaction will be approved. The price impact and proceed impact are added to the price curves and proceed curves plotted on the probability graph. Adding the price impact and proceed impact causes the curves to shift and alters the areas on the graph indicating high and low probability of deal approval.

Figure 8:
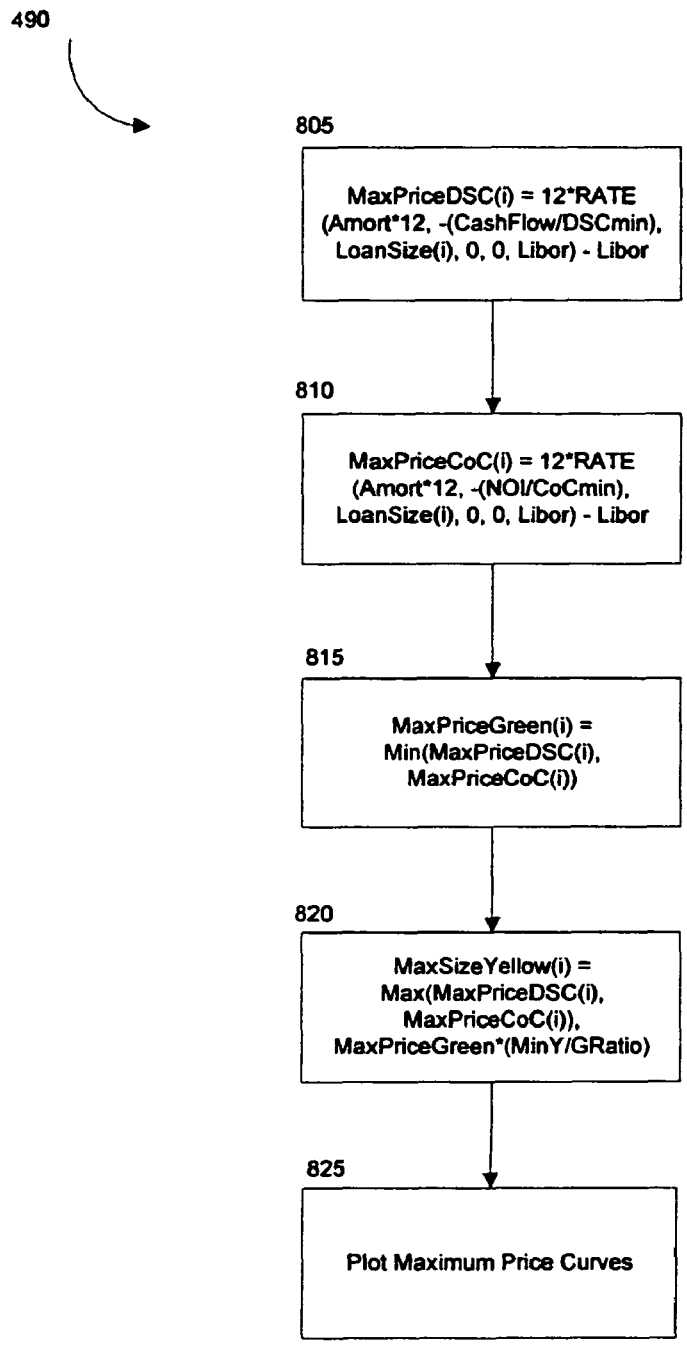
FIG. 8 is a logic flow diagram illustrating an exemplary process for calculating maximum loan pricing lines in accordance with an exemplary embodiment of the present invention.
Figure 9:
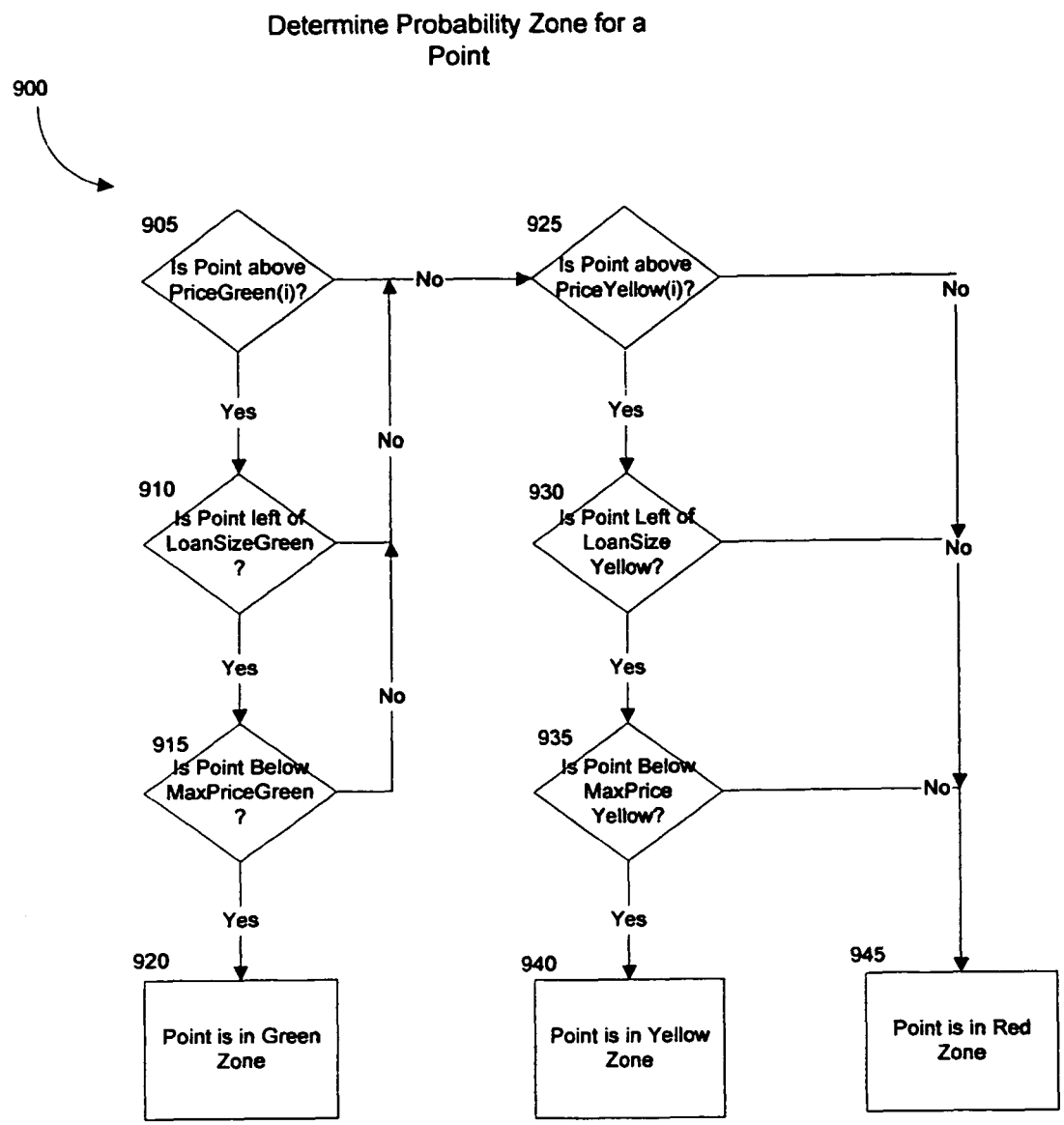
FIG. 9 is a logic flow diagram illustrating an exemplary process for determining the probability zone of a transaction on a price/proceeds graph in accordance with an exemplary embodiment of the present invention.

In step 475, the transaction evaluator 135 calculates the loan size array. The loan size array is a set of data points ranging from the minimum loan size to the maximum loan size. This calculation is illustrated in greater detail in FIG. 5. Referring to FIG. 4B, in step 480, the transaction evaluator 135 calculates the minimum price curves to be plotted on the probability graph. There are a variety of ways to calculate the price of a loan. The exemplary embodiment illustrated herein utilizes two different pricing metrics known as loan to value and debt service coverage pricing. The calculation and placement of the pricing curves is illustrated in greater detail in FIGS. 6A, 6B, and 6C. In step 485, the transaction evaluator 185 calculates the proceed cutoffs for the probability graph. The proceed cutoffs are maximum amounts the investor is willing to provide based on the data supplied by the customer. The calculation for the proceed cutoffs is shown in greater detail in FIG. 7. In step 490 the transaction evaluator 135 calculates the maximum pricing curves based on the debt service coverage and cash on cash pricing metrics. The calculation for the maximum pricing curves is shown in greater detail in FIG. 8. The previously calculated minimum price curves, proceed cutoffs, and maximum price curves are then displayed on the probability graph in step 495. To make the probability graph easier to use it can be shaded to illustrate which areas encompass the greater probability of approval for the transaction. The probability zones are generally delineated into three areas shaded green, yellow, and red. The process for determining which areas of the graph to shade is illustrated in FIG. 9.

Figure 5:
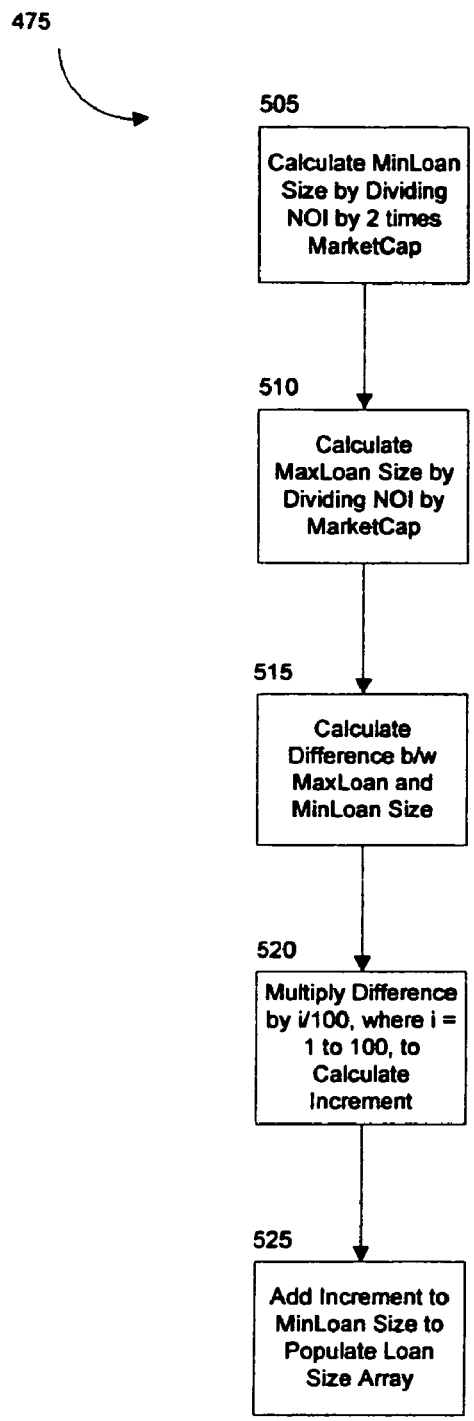
FIG. 5 is a logic flow diagram illustrating an exemplary process for calculating a loan size array in accordance with an exemplary embodiment of the present invention.

FIG. 5 illustrates an exemplary process for calculating the loan size array referred to in step 475. Beginning with step 505, the transaction evaluator 135 calculates the minimum loan size by dividing the customer's net operating income by two times the market capitalization rate. In step 510, the transaction evaluator 135 calculates the maximum loan size by dividing the customer's net operating income by the market capitalization rate. Taking the difference between the maximum and minimum loan sizes, the transaction evaluator 135 then multiplies the difference by I/100, where I is the set of integers ranging from 1 to 100. The 100 incremental values created in step 520 are then added to the minimum loan size in step 525. This operation creates the loan size array of 100 data points ranging between the minimum and maximum loan sizes.

Figure 6A:
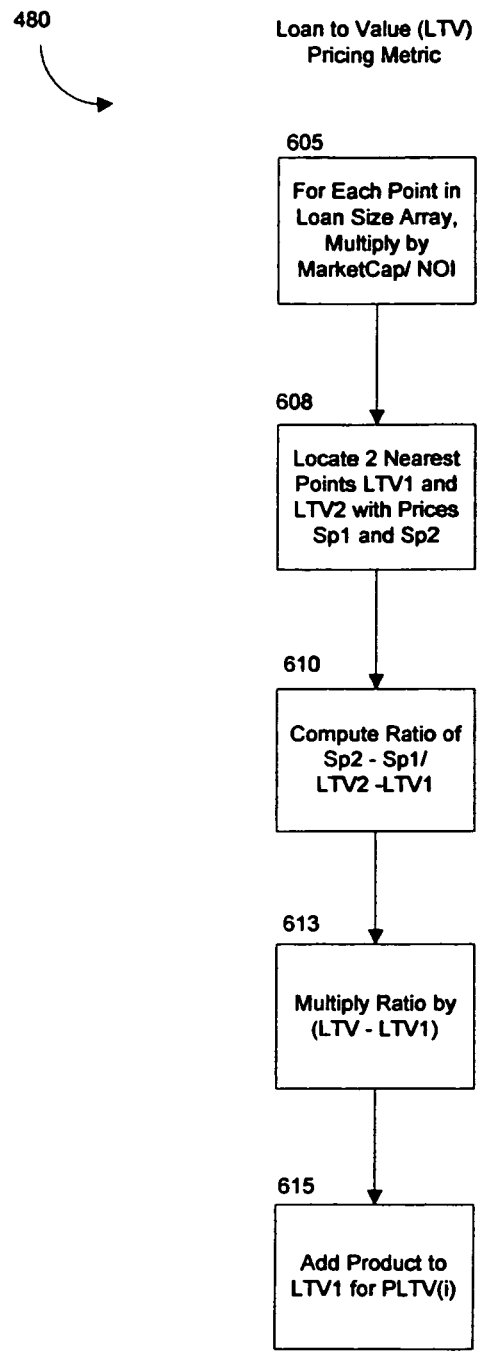
FIGS. 6A, 6B, and 6C show logic flow diagrams illustrating exemplary processes for calculating and placing loan-to-value and debt service coverage pricing curves in accordance with an exemplary embodiment of the present invention.
Figures 6B, 6C:
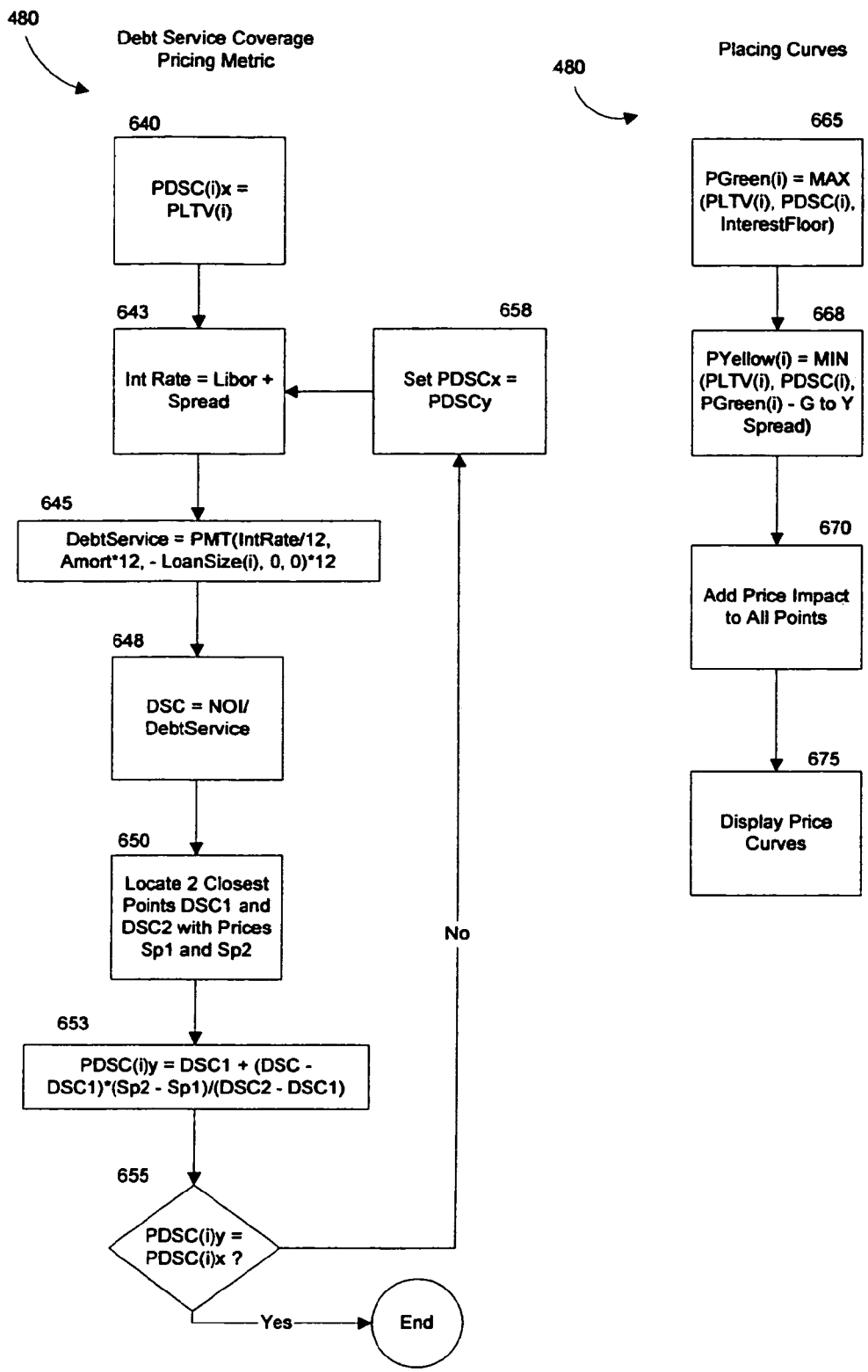

Referring to FIGS. 6A, 6B, and 6C, exemplary processes for calculating and placing the minimum price curves are illustrated. Price can also be referred to as the spread and is typically calculated in basis points. The price or spread generally comprises a standard interest rate, such as the LIBOR or treasury rate, plus additional points for the cost of the transaction. The minimum price curves define the lower boundaries in the price/proceeds probability graph. Starting with the loan-to-value (LTV) pricing metric in FIG. 6A, in step 605, each point in the loan size array calculated in FIG. 5 is multiplied by the market capitalization rate and divided by the customer's net operating income for the given collateral. For each point in the new LTV array, the two nearest points (LTV1 and LTV2) in the relevant pricing matrix are located in step 608. Pricing matrices are commonly used as a tool to guide investors and comprise tables of price data and interest rates for various financial products. In steps 610, 613, and 615, the minimum price for a point is calculated, using line approximation, in the following manner:

$$PLTV(i)=LTV1+(LTV-LTV1)*(Spread2-Spread1)/(LTV2-LTV1).$$

This calculation is performed for each point and an LTV price array (PLTV) is assembled.

The other pricing metric involves a debt-service-coverage (DSC) calculation that requires a few iterations. The reason for the iterations is that price is dependent on DSC, but the DSC calculation requires price. After a few iterations of the calculation, an equilibrium point is generally reached. In alternative embodiments of the present invention, other pricing metrics, such as cash-on-cash, may be employed to calculate the minimum pricing lines.

In FIG. 6B, an exemplary method for calculating the DSC (i) price array is illustrated. In step 640, the DSC(i) array is assumed equal to the LTV(i) array. Then the DSC(i) array is revised through a number of iterations of the following calculations in steps 643, 645, and 648:

IntRate=Libor+Spread

DebtService=PMT(IntRate/12, Amort*12, -LoanSize(i), 0, 0)*12 where PMT=[IntRate(FV+PV(1+IntRate)$^N$)]/[1-(1+IntRate)$^N$]

FV=0

PV=-LoanSize(i)

DSC(i)=Cashflow/DebtService

For each point in the DSC array, the two closest points, DSC1 and DSC2, in the relevant pricing matrix are located in step 650. The price is calculated for each point in step 653 in the following manner:

$$PDSC(i)=DSC1+(DSC-DSC1)*(Spread2-Spread1)/(DSC2-DSC1)$$

If the newly calculated DSC price matrix is equal to the original DSC price matrix in step 655, the calculation has reached equilibrium. If the transaction evaluator has not reached equilibrium, the DSC price metric is updated in step 658 and the process is repeated.

Referring to FIG. 6C, an exemplary method for placing the minimum price curves once the two price metrics are calculated is illustrated. In this exemplary embodiment two price curves, called green and yellow, are placed on the price/proceeds graph. The green price curve defines the minimum price boundary for deals with a strong likelihood of approval. The yellow price curve defines a minimum price boundary for deals with a marginal likelihood of approval. In step 665, the green price curve is identified by selecting the maximum of the two curves created by the pricing metrics or an interest rate floor set by the investor. In step 668, the yellow price curve is defined as the minimum of the two price metric curves or the green curve minus a predetermined spread selected by the investor. In step 670, the green and yellow price curves are adjusted by adding or subtracting the price impact calculated in step 460. In step 675, the green and yellow price curves, which define minimum price boundaries on the price/proceed graph, are plotted on the graph.

Figure 7:
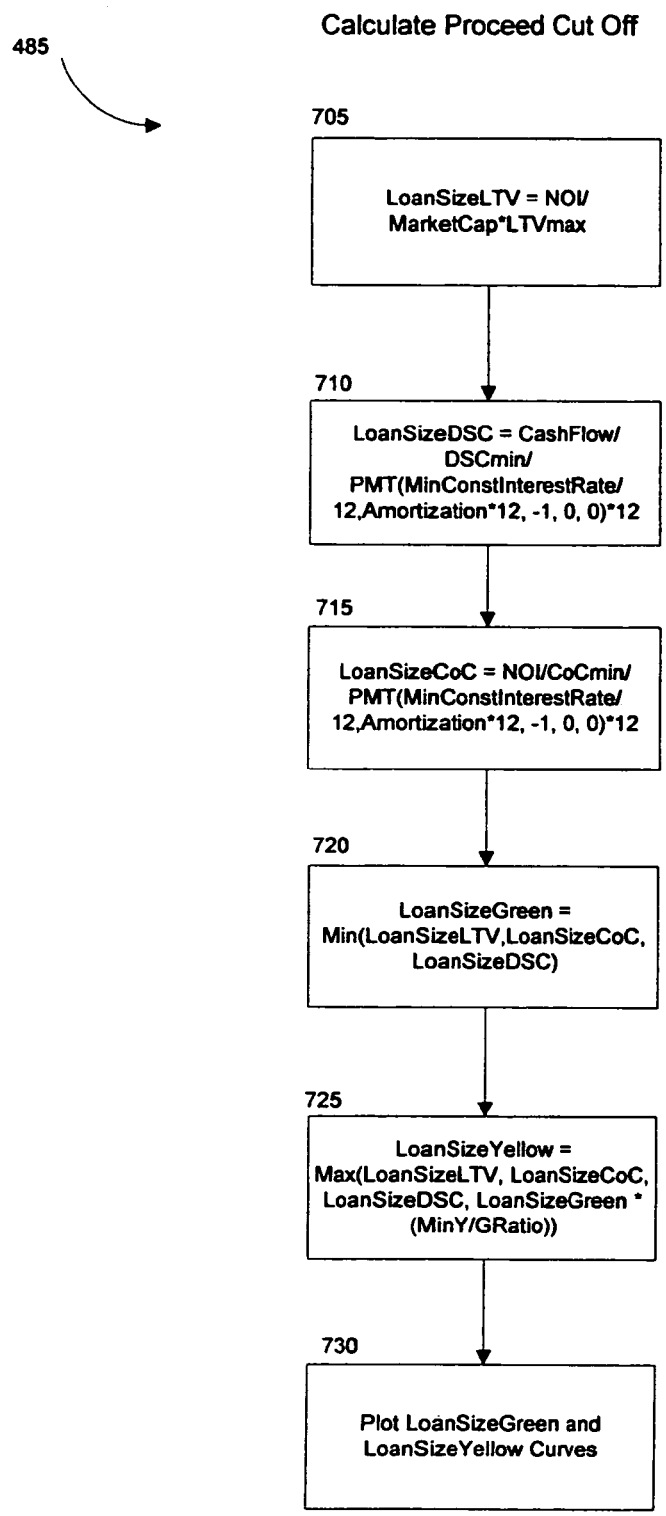
FIG. 7 is a logic flow diagram illustrating an exemplary process for calculating loan proceed cutoffs in accordance with an exemplary embodiment of the present invention.

Referring to FIG. 7, an exemplary method 485 for calculating a proceed cutoff is illustrated. The proceed cutoffs typically define the boundary on the right hand side of the price/proceed graph. For each set of product and collateral type, a set of underwriting criteria is stored in the transaction evaluator 135. The underwriting criteria are identified as the following variables:

[LTVmax]
[DSCmin]
[COCmin]
[MinConstIntRate]
[MinYellowGreenRatio]

Three different loan sizes are calculated using loan-to-value, debt-service-coverage, and cash-on-cash pricing in steps 705, 710, and 715 as follows:

LoanSizeLTV=[NOI]/[MarketCap]*[LTVmax]

LoanSizeDSC=[Cashflow]/[DSCmin]/(PMT([MinConstIntRate]/12, Amortization*12, -1,0,0)*12)

and

LoanSizeCOC=[NOI]/[COCmin]/(PMT([MinConstIntRate]/12, Amoritization* 12, -1, 0, 0)*12).

In step 720, the loan size boundary for the green area on the price/proceeds graph is defined as the minimum of the three loan size points. In step 725, the loan size boundary for the yellow area is defined as the maximum of the three loan size points and the green area loan size times [MinYellowGreen- Ratio]. In step 730, the proceed boundaries for the green and yellow areas on the graph are plotted.

The last portion of the price/proceeds graph is created with the maximum pricing curves. The maximum price curves form the upper boundaries of the green and yellow areas on the graph and are defined by the minimum DSC and COC values, typically chosen by the investor or transaction evaluator. An exemplary method 490 for calculating the maximum price curves is shown in FIG. 8. In step 805, the maximum DSC price is calculated for each point in the loan size array in the following manner:

$$MaxPriceDSC(i)=12*Rate(Amortization*12, -[CashFlow]/[DSCmin], LoanSize(i), 0, 0, Libor)-Libor.$$

In step 810, the maximum COC price is calculated for each point in the loan size array as follows:

$$MaxPriceCOC(i)=12*Rate(Amortization*12, -[NOI]/[COCmin], LoanSize(i), 0, 0, Libor)-Libor.$$

Using these curves, the maximum price curves for the green and yellow areas of the graph are defined as follows in steps 815 and 820:

$$MaxPriceGreen(i)=Min(MaxPriceDSC(i), MaxPriceCOC(i))$$

$$MaxPriceYellow(i)=Max(MaxPriceDSC(i), MaxPriceCOC(i), MaxPriceGreen*(MinY/GRatio)).$$

In step 825, plotting of the maximum price curves on the price/proceeds graph completes the green, yellow, and red zones of the graph. Now the graph can be displayed and used to show which probability zone a particular transaction falls into.

Figure 14:
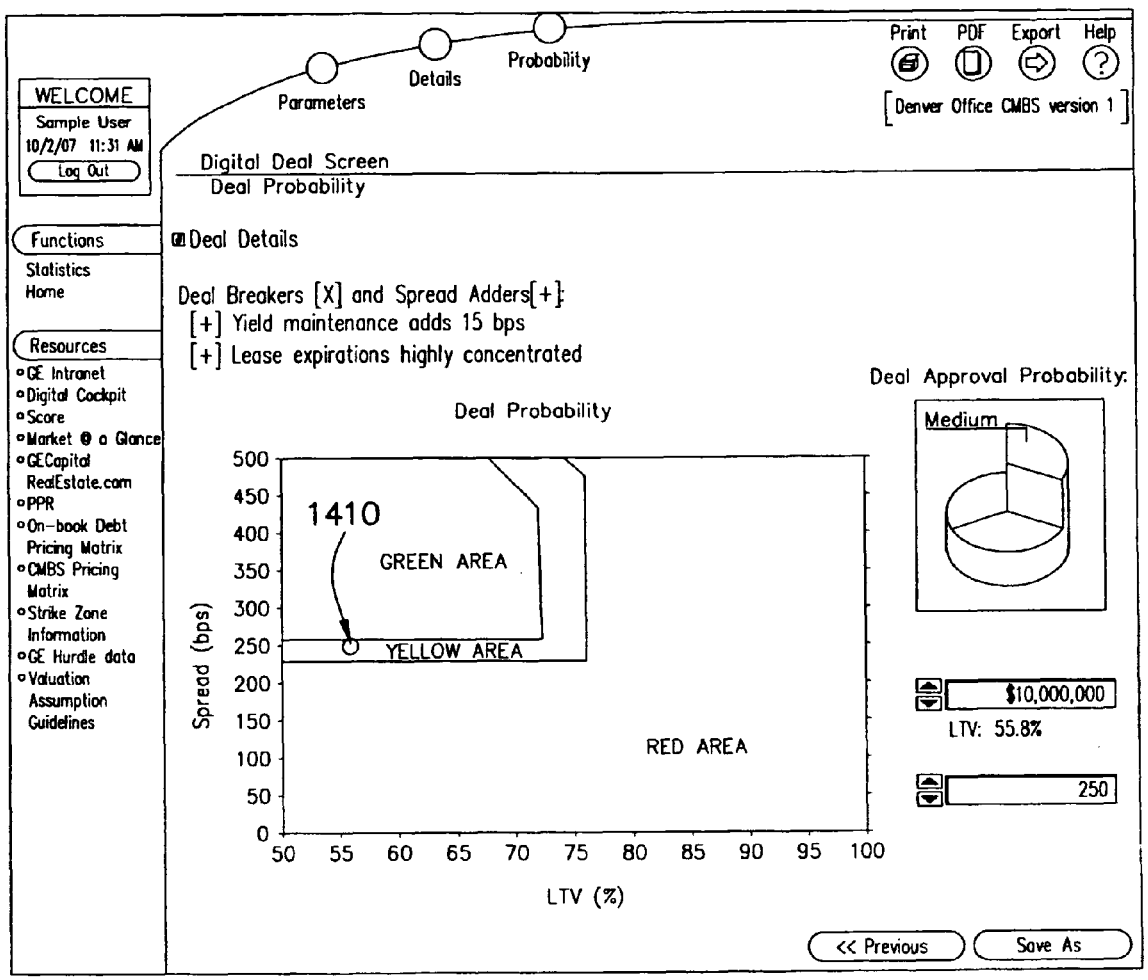
FIG. 14 is a display screen illustrating the probability of a loan transaction being approved over a range of loan values based on product specific information.

An exemplary price/proceeds graph is illustrated in FIG. 14 with an exemplary point 1410 lying in the yellow zone of the graph. Referring to FIG. 9, an exemplary process is illustrated for determining which zone a particular transaction falls into. Each transaction has a price and proceed amount that produce a point on the graph. In steps 905, 910, and 915, the transaction evaluator 135 determines whether the point lies within the green zone boundary curves. If the answers to these queries is yes, the transaction has a high likelihood of being approved by the investor. Alternatively, if the responses to the queries in steps 925, 930, and 935 are affirmative, the transaction falls into the yellow zone and has a marginal probability of being approved. If the point does not fall into either of the foregoing areas on the graph, the transaction is in the red zone and is unlikely to be approved. The price/proceeds graph is a helpful visual tool for representing the calculations that are involved in evaluating a potential real estate transaction. The graph is also valuable because it allows the originator to see how modifying the price or proceed amount will affect the probability of approval.

In conclusion, the present invention, as described in the foregoing exemplary embodiments, enables the evaluation of a real estate transaction based on preliminary information. The transaction evaluator can receive initial information about the collateral, the customer's income, and the size of the loan. Using the initial information and predetermined parameters selected by the investing institution, the transaction evaluator can calculate the likelihood that the deal will be approved for a range of dollar amounts.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalence thereof. For instance, the present invention could be used by lenders to evaluate other types of transactions beyond real estate. The invention could also be employed by other investors or customers, aside from the traditional commercial lenders described herein, to evaluate a variety of business transactions. Although the present invention has been described as operating in a client-host configuration, it should be understood that the invention can be applied to other types of distributed computing environments.

What is claimed is:

1. A computer-implemented method for making a preliminary evaluation of a probability an investor will approve a real estate transaction comprising the steps of:
   receiving by a computer identifying information for the real estate transaction from a customer comprising a product type, a collateral type, and a geographic market;
   retrieving from a database coupled to the computer a scope parameter corresponding to at least one component of the received identifying information;
   comparing by the computer the received identifying information and the scope parameter;
   if the identifying information satisfies the scope parameter, receiving by the computer product specific information from the customer, the product specific information comprising an amount of the product, a product fee, and a collateral age, where the product specific information is related to the real estate transaction;
   determining by the computer the probability that the real estate transaction will be approved based on the received product specific information; and
   presenting the probability for the preliminary evaluation of the real estate transaction to the investor.

2. The method of claim 1, wherein the product type is one selected from the group comprising on-book debt, equity, and mortgage-backed securities.

3. The method of claim 1, wherein determining a probability that the transaction will be approved comprises:
   calculating a loan size array;
   calculating a minimum price curve;
   calculating a maximum price curve;
   calculating a proceed cutoff curve; and
   determining a position of the amount of the product in relation to the minimum price curve, the maximum price curve, and the proceed cutoff curve.

4. A computer-implemented method for evaluating a real estate transaction comprising the steps of:
   receiving by a computer identifying information for the real estate transaction from a customer comprising a product type, a collateral type, and a geographic market;
   retrieving from a database coupled to the computer a scope parameter corresponding to at least one component of the received identifying information;
   comparing by the computer the received identifying information and the scope parameter;
   if the identifying information satisfies the scope parameter, receiving by the computer product specific information from the customer, the product specific information comprising an amount of the product, a product fee, and a collateral age, where the product specific information is related to the real estate transaction;

retrieving from a database coupled to the computer an impact parameter for each item of product specific information received;

calculating a total impact from each of the impact parameters for each item of product specific information; and comparing the total impact to a predetermined strike zone hurdle and presenting the comparison to an investor.

5. The method of claim 4, wherein the product type is one selected from the group comprising on-book debt, equity, and mortgage-backed securities.

6. A non-transitory computer-readable storage device storing computer-executable instructions for making a preliminary evaluation of a probability an investor will approve a real estate transaction comprising:

first instructions to receive by a computer identifying information for a real estate transaction from a customer comprising a product type, a collateral type, and a geographic market;

second instructions to retrieve from a database coupled to the computer a scope parameter corresponding to at least one component of the received identifying information;

third instructions to compare at the computer the received identifying information and the scope parameter;

fourth instructions, if the identifying information satisfies the scope parameter, to receive product specific information from the customer, the product specific information comprising an amount of the product, a product fee, and a collateral age, where the product specific information is related to the real estate transaction;

fifth instructions to determine by the computer the probability that the real estate transaction will be approved based on the received product specific information; and sixth instructions to present the probability for the preliminary evaluation of the real estate transaction to the investor.

7. The computer-readable medium of claim 6, wherein the product type is one selected from the group comprising on-book debt, equity, and mortgage-backed securities.

8. The computer-readable medium of claim 6, wherein the fifth instructions to determine the probability that the transaction will be approved further comprise:

seventh instructions to calculate a loan size array;

eighth instructions to calculate a minimum price curve;

ninth instructions to calculate a maximum price curve;

tenth instructions to calculate a proceed cutoff curve; and eleventh instructions to determine a position of the amount of the product in relation to the minimum price curve, the maximum price curve, and the proceed cutoff curve.

9. A non-transitory computer-readable storage device storing computer-executable instructions for evaluating a real estate transaction comprising:

first instructions to receive by a computer identifying information for the real estate transaction from a customer comprising a product type, a collateral type, and a geographic market;

second instructions to retrieve from a database coupled to the computer a scope parameter corresponding to at least one component of the received identifying information;

third instructions to compare at the computer the received identifying information and the scope parameter;

fourth instructions, if the identifying information satisfies the scope parameter, to receive product specific information from the customer, the product specific information comprising an amount of the product, a product fee, and a collateral age, where the product specific information is related to the real estate transaction identifying information;

fifth instructions to retrieve from a database coupled to the computer an impact parameter for each item of product specific information received;

sixth instruction to calculate a total impact from each of the impact parameters for each item of product specific information; and seventh instructions to compare the total impact to a predetermined strike zone hurdle and presenting the comparison to an investor.

10. The computer-readable medium of claim 9, wherein the product type is one selected from the group comprising on-book debt, equity, and mortgage-backed securities.

11. A system for evaluating a real estate transaction comprising:

a server computer coupled to a client computer via a computer network;

a data source coupled to the server computer;

a transaction evaluator software module stored and running on the server computer and operable for:

receiving identifying information for the real estate transaction from the client computer, where the identifying information includes a product type, a collateral type, and a geographic market;

retrieving from the data source coupled to the server computer a scope parameter corresponding to at least one component of the received identifying information;

comparing by the server computer the received identifying information and the scope parameter;

if the identifying information satisfies the scope parameter, receiving by the server computer product specific information from the client computer, the product specific information comprising an amount of the product, a product fee, and a collateral age, where the product specific information is related to the real estate transaction;

determining by the server computer a probability that the real estate transaction will be approved based on the received product specific information; and transmitting the probability for a preliminary evaluation of the real estate transaction to the client computer.

12. The system of claim 11, wherein the client computer is operated by a loan originator.

13. The system of claim 11, wherein the client computer is operated by a customer.

14. A system for evaluating a real estate transaction comprising:

a server computer coupled to a client computer via a computer network;

a data source coupled to the server computer;

a transaction evaluator software module stored and running on the server computer and operable for:

receiving identifying information for the real estate transaction from the client computer, where the identifying information includes a product type, a collateral type, and a geographic market;

retrieving from the data source coupled to the server computer a scope parameter corresponding to at least one component of the received identifying information;

comparing at the server computer the received identifying information and the scope parameter;

if the identifying information satisfies the scope parameter, receiving by the server computer product specific information from the client computer, the product specific information comprising an amount of the product, a product fee, and a collateral age, where the product specific information is related to the real estate transaction;

retrieving from the data source coupled to the server computer an impact parameter for each item of product specific information;

calculating a total impact from each of the impact parameters for each item of product specific information; and comparing the total impact to a predetermined strike zone hurdle and transmitting the comparison to the client computer.

15. The system of claim 14, wherein the client computer is operated by a loan originator.

16. The system of claim 14, wherein the client computer is operated by a customer.

* * * * *